Dec. 3, 1929.　　　　W. Y. HITER　　　　1,738,068
FEED BARRIER FOR MANGERS
Filed March 22, 1928　　　2 Sheets-Sheet 2
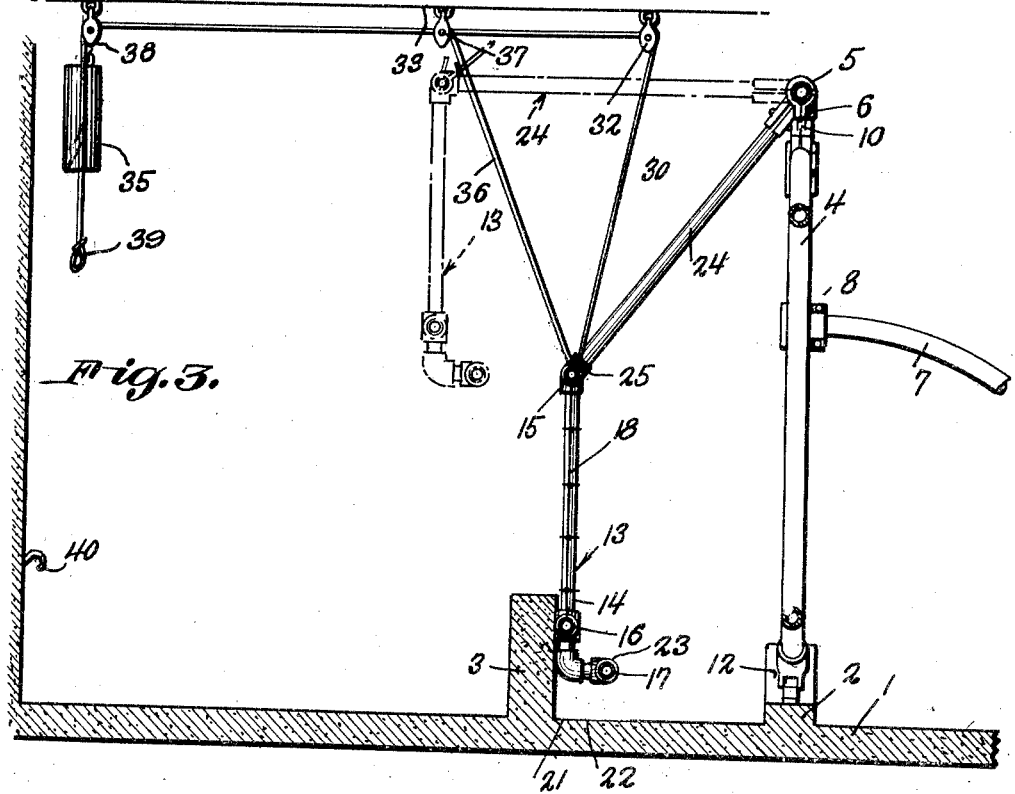
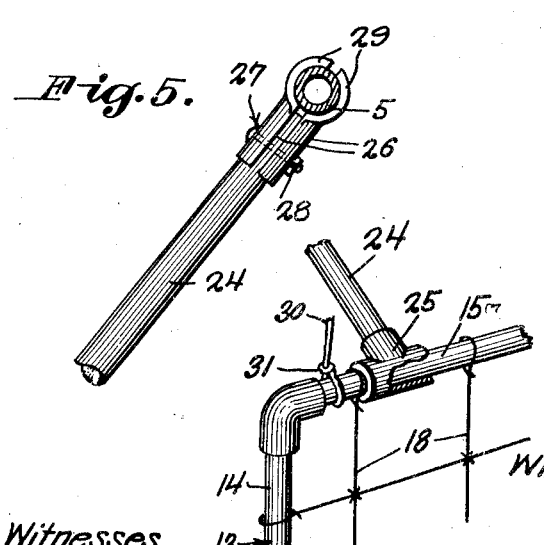
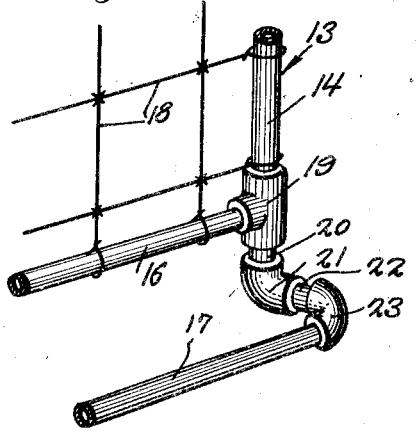
William Y. Hiter, Inventor
Witnesses Patented Dec. 3, 1929

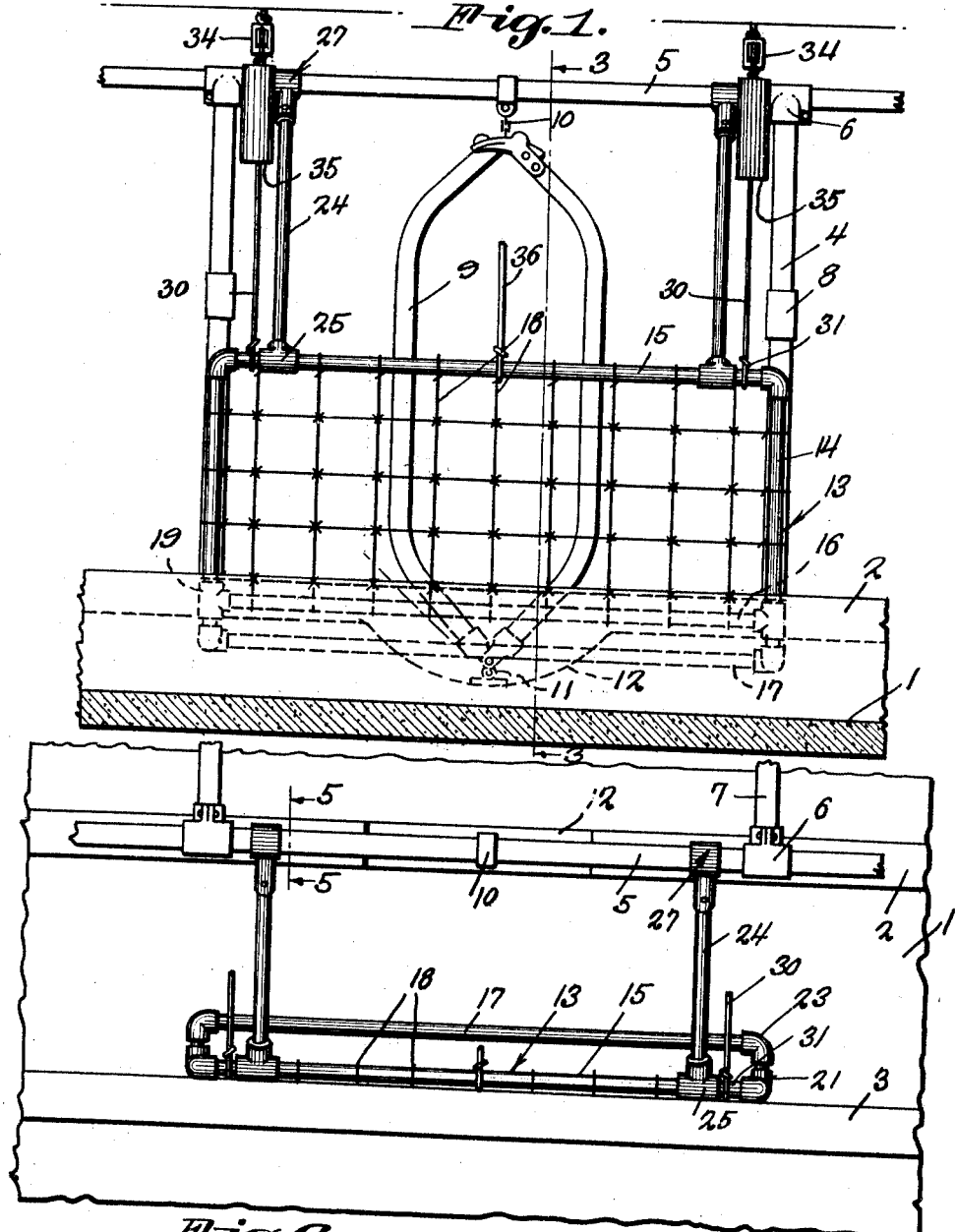

1,738,068

UNITED STATES PATENT OFFICE

WILLIAM Y. HITER, OF LOUISA, VIRGINIA

FEED BARRIER FOR MANGERS

Application filed March 22, 1928. Serial No. 263,839.

This invention relates to improvements in mangers and has as its primary object to provide novel means for preventing the cows throwing the hay or fodder from the trough of the manger onto the floor, the invention therefore contemplating the provision of means whereby cows may be fed more economically and more efficiently than in mangers of the ordinary construction.

It is a well known fact that cows, in feeding in a manger, will root or nose the hay or fodder, while eating, in a manner to discharge a greater or less quantity thereof over the rear wall or curb of the manger trough with the result that this feed is practically a waste. Therefore the present invention has as a further object to provide a guard which will normally assume an upright position within the rear side of the manger trough and which will be so constructed that the hay or fodder deposited in the trough to serve as food for the cows, cannot be tossed or thrown out of the trough and onto the floor.

Another object of the invention is to provide a guard for the purpose stated so constructed and so mounted that, when it is desired to introduce hay or fodder or other food into the manger trough, it is only necessary to exert minimum effort to effect a displacement of the guard to an elevated or inactive position where it will be supported while the feed is being introduced into the manger trough, the same slight effort being necessary in restoring the guard to its lowered or active position, so that the normal presence of the device to serve its useful purpose in preventing waste of feed, does not in any way interfere with the introduction of feed into the manger trough nor does it in any way interfere with cleaning of the trough when this is required.

Another object of the invention is to provide a device for the purpose stated which will be so constructed that it may be readily mounted and installed upon the well known type of stall and stanchion structures now in common use and without any necessity of altering the construction of the installed structure or in any way interfering with the opening and closing of the stanchions.

The guard referred to above is, as stated, intended to prevent the cows tossing or throwing the hay or fodder out of the trough and onto the floor, and the invention has as a further object to provide, in connection with this guard or barrier, means for preventing the cows rooting chop, ensilage, or other small feed, out of the trough and over the wall thereof.

A further object of the invention is to provide means for holding the guard in full elevated position so that it will be out of the way at the time feed is being introduced into the trough and likewise while the trough is being cleaned.

While the accompanying drawings and the description which is to follow, constitute a disclosure of the preferred embodiment of the invention, it will be understood that various changes may be made within the scope of what is claimed.

In the accompanying drawings:

Figure 1 is a view in front elevation of the guard structure embodying the invention, the guard being lowered and therefore occupying an active position;

Figure 2 is a top plan view of the structure shown in Figure 1;

Figure 3 is a vertical front to rear sectional view taken substantially on the line 3—3 of Figure 1 looking in the direction indicated by the arrows;

Figure 4 is a fragmentary sectional perspective view illustrating one lower corner of the guard;

Figure 5 is a detail vertical sectional view taken substantially on the line 5—5 of Figure 2 looking in the direction indicated by the arrows;

Figure 6 is a fragmentary perspective view illustrating one upper corner of the guard and a portion of one of the supporting members therefor.

The guard structure embodying the invention is employed in connection with the modern types of mangers such as are in common use on dairy farms and such mangers are usually of concrete formation, the numeral 1, in the drawings, indicating the floor and the numerals 2 and 3 indicating respectively the front and rear walls of the trough into which the hay or other fodder or feed is to be deposited, the space in front of the front wall 2 of the trough being divided into a number of stalls through the medium of upright frame structures including stiles or standards 4, the lower ends of which are embedded in the wall 2, a longitudinal top bar 5 to which the upper ends of the standards 4 are connected by suitable couplings 6, and arcuate division bars 7 which are connected at their upper ends by couplings 8 to the standards 4 and at their lower ends are either embedded in the floor 1 or anchored to a securing means embedded in or secured to the floor, these bars 7 defining the side walls of the stalls and serving to prevent the cows interfering with one another during the feeding period, and, as is now common practice, stanchions 9 are suspended at their upper ends as at 10 from the top bar 5 of the frame structure midway between the uprights 4 of the stalls and are connected at their lower ends as at 11 in the bottoms of recesses 12 which are formed in the upper side of the front wall 2 of the trough at intervals, this arrangement providing for maximum freedom of movement of the animals' heads while feeding and at the same time preventing any of the animals leaving their stalls during the feeding period.

The construction above described is that ordinarily employed on modern dairy farms but it presents certain disadvantages which it is the object of the present invention to overcome. In the first place, while the described arrangement provides for maximum freedom of movement of the animals' heads while they are feeding, and this is very desirable, at the same time it has been found that the animals, in taking up the hay or other fodder, will frequently throw a greater or less quantity thereof over the rear wall 3 of the manger trough and onto the floor in rear of this wall where it is beyond the reach of the animals and, as a consequence, a considerable amount of fodder is wasted. Another disadvantage presented by the ordinary trough structure is that the cows will nose or throw the finer feed over the rear wall of the trough. The guard structure, embodying the invention, is intended, as before explained, to overcome these disadvantages, and the structure embodies a barrier which is indicated in general by the numeral 13 and comprises a rectangular frame including side members 14, a top bar 15 and bottom bars 16 and 17, the sides 14 and the top bar 15 and bottom bar 16 defining an oblong rectangle within which is arranged a wire screen 18 preferably consisting of horizontally and vertically strung wires. It will be observed by reference to Figures 2, 3 and 4 of the drawings that, while the bottom bar 16 of the barrier frame occupies a common plane with the side bars 14 and top bar 15, the other bottom bar 17 is located below and offset with respect to the bar 16, the bar 16, as illustrated most clearly in Figure 4 of the drawings, being connected by a T-coupling 19, at its ends, with the respective side bars 14, and a short length of pipe 20 being fitted into the lower branch of each T-coupling 19 and having fitted thereto an elbow 21 into the other end of which is fitted a short length of pipe 22 to which in turn is fitted one end of an elbow 23, the bar 17 being fitted at its ends into the other ends of the two elbows 23. In this manner the bar 17 is positioned, as above described, with respect to the bar 16, and when the barrier is in operative position as illustrated most clearly in Figures 2 and 3 of the drawings, the lower portion of the barrier frame will rest against the inner side of the rear wall 3 of the feed trough of the manger and the bar 17 and its connections 21 and 23 will occupy a position from eight to ten inches below the top of the wall 3 of the trough and with the bar 17 extending parallel to the inner side of the said rear wall 3 and spaced inwardly therefrom. As will presently be described, the barrier is supported in upright position with its lower portion occupying the position above described, within the trough, and at this point it will be evident that not only does the arrangement of the bars 16 and 17 render the lower portion of the structure more rigid and secure than would be the case if but a single one of the bars should be employed, but, furthermore, the cows will be prevented, by the presence of the bar 17, from throwing chop, ensilage, or other small feed, over the wall 3 of the trough.

The supporting means for the barrier, above referred to, comprises a pair of arms which are indicated in general by the numeral 24, and these arms are preferably formed from lengths of pipe or rod material, either as may be found convenient, and interiorly smooth T-couplings 25 are fitted rotatably to the top bar 15 of the barrier frame substantially at the ends thereof and the lower end of each arm 24 is threaded or otherwise secured in the branch of a respective one of these couplings. In this manner a pivotal connection is established between the lower ends of the arms 24 and the top rail 15 of the barrier frame. To the upper end of each of the arms 24 there are fitted the two sections 26 of a pivotal sleeve coupling 27, the sections being secured in place by a bolt 28, and the coacting parts of the coupling, which are indicated by the numeral 29, being disposed to fit the top rail 15 of the stall frame structure. By reference to Figures 2 and 3 of the drawings it will be observed that, when the guard 13 is in active position, the barrier will assume a vertical position within the rear side of the feed trough, the length of the arms 24 being such that these arms will extend downwardly and rearwardly from the top rail 5 of the stall frame and so brace the upper portion of the barrier that the barrier will occupy a true vertical plane, the lower portion of the barrier resting against the inner side of the rear wall 2 of the trough and spaced above the bottom of the trough. It will also be evident by reference to Figure 3 that, when the arms 24 are swung upwardly together with the barrier 13, to the broken line position shown in said figure, the barrier will be suspended freely from the lower ends of the arms 24 and in a vertical plane, but spaced above and in advance of the rear wall 3 of the trough and entirely clear of the same so that hay or other fodder may be delivered into the trough to be consumed by the animals. In order that the movement of the barrier into and out of active position may be readily effected, a flexible cable 30 is connected at one end as at 31 to each end of the top rail 15 of the barrier frame immediately adjacent the couplings 25, and these cables are led over pulleys 32 suspended beneath the ceiling 33 of the barn in which the manger is installed, and likewise over other pulleys 34, the pulleys 32 being located above and slightly in advance of the plane occupied by the rear wall 3 of the trough, and the pulleys 34 being located a considerable distance in rear of the pulleys 32, counterweights 35 equal in weight substantially to the weight of the barrier 13 being connected to the free ends of the cables and suspended thereby. It will now be evident that when the barrier 13 is in the lowered position illustrated in Figures 1, 2 and 3 of the drawings, it will serve effectually to prevent any loss of fodder such as would be occasioned by the cows tossing the same from the trough over the rear wall thereof and onto the floor, thus effecting a great economy in the use of fodder for the animals. It will be observed by reference to Figures 1 and 3 of the drawings that when the barrier is in the lowered position, the weights 35 will be in contact with the pulleys 34 and thus the lower portion of the barrier will be spaced above the floor of the trough. It will also be evident that, due to the foraminous nature of the barrier, any fodder which the animals may elevate to position against the barrier may either be consumed by the animals or will be returned into the trough. It will also be evident that due to the engagement of the lower portion of the barrier frame against the inner surface of the rear wall 3 of the trough, there can be no outward or rearward swinging displacement of the frame and furthermore any force which is exerted against the barrier, by the cows striking the same with their heads, will be resisted by the engagement of the lower portion of the said barrier with the rear wall of the trough and therefore substantially no strain will be imposed upon the supporting arms 24 and their connections. On the other hand it will be evident that due to the provision of the cables 30 and the counterweights 35, the attendant may readily grasp the barrier and swing the same upwardly to the elevated position shown in broken lines in Figure 3 of the drawings and in order that the barrier may be held in its elevated position while feed is being supplied to the trough or the trough is being cleaned, a cable 36 is connected to the bar 15 of the barrier intermediate the ends thereof and is led upwardly and about a pulley 37 suspended beneath the ceiling 33 and about another pulley 38 likewise suspended beneath the ceiling and between the pulleys 34, the cable, beyond the pulley 38, being led downwardly and provided with a loop 39 at its end engageable with a hook 40 fixed upon the adjacent wall of the manger, it being understood that the loop carrying end 39 of the cable 36 is drawn downwardly as the barrier is swung upwardly. It will further be apparent that the movement of the barrier into and out of active position may not only be readily accomplished without any considerable exertion, but furthermore, due to the free suspension of the barrier from the lower ends of the arms 24, the barrier may be adjusted momentarily, so as to clear the rear wall 3 of the trough as the barrier is moved into and out of active position.

In the drawings a single barrier is illustrated as employed in connection with a single one of the stalls, but it will be readily understood that the barriers might be made in lengths sufficient to enable a single barrier to serve in connection with two, three, or in fact any desired number of stalls, and, as this is a mere duplication or carrying forward of the idea illustrated in the drawings, it has been deemed unnecessary to further illustrate the same.

It will also be evident from the foregoing description and from an inspection of the drawings that not only does the provision of the barrier 13 provide against the waste of feed or the labor and time necessary to a collection of the feed from the barn floor in rear of the trough, when such feed has been nosed or tossed by the animals, from the trough, but it likewise is so constructed that the rear wall of the trough may be formed of a minimum height thus avoiding cutting off light from the trough as is the case where the rear wall of such a trough is formed of an exceptional height in order to prevent waste of the feed, and likewise, due to the permissible formation of the rear wall relatively low in height, an unobstructed circulation of air within the trough is provided for thus rendering the same more sanitary than where light and air are to some extent excluded.

Having thus described the invention, what I claim is:

1. The combination with a manger trough, of a barrier, and means supporting the barrier in upright position beside the rear wall of the trough and with its lower portion within the trough in engagement against the inner side of said wall, the lower portion of the barrier being offset and including a transverse feed baffle member spaced inwardly from the plane of the barrier as a whole and from the said wall of the trough and positioned to lie above the bottom of the trough, the supporting means providing for movement of the barrier bodily upwardly out of the first mentioned position.

2. The combination with a manger trough, of a barrier comprisng a barrier frame including top and bottom members and side members and an open work filler within the frame, the said frame including a forward extension at its lower portion, a rail constituting a part of said extension and adapted, in one position of the barrier to rest above and in spaced relation to the upper side of the bottom of the trough, and means supporting the barrier in upright position with its lower portion so arranged and engaging against the forward side of the rear wall of the trough, the supporting means being capable of movement to provide for movement of the barrier bodily out of such position.

3. The combination with a manger trough, of a barrier, including a barrier frame, extensions at the lower ends of the sides of the frame, a bar extending longitudinally between the ends of said extensions, and means supporting the barrier frame in upright position with its lower portion resting beside the rear wall of the trough and with its extensions extending above and in spaced relation to the upper side of the bottom of the trough with said bar extending longitudinally along the upper side of the bottom of the trough in spaced relation thereto and to the inner side of the said rear wall, the supporting means providing for movement of the barrier bodily out of such position.

4. The combination with a manger trough, of a barrier, means supporting the barrier in upright position beside the rear wall of the trough and in engagement with the inner side of said wall and for movement bodily out of such position, and a bar constituting a feed baffle extending longitudinally of the lower portion of said barrier and, in the said upright position of the barrier extending above and in spaced relation to the upper side of the bottom of the trough and in spaced relation to the said rear wall thereof.

5. The combination with a manger trough and a stall frame structure assembled therewith and including a top bar, of arms swingingly connected with said top bar, a barrier including a barrier frame having a top bar to which the arms are pivotally connected, the arms, in their lowered position of adjustment, suspending the barrier frame substantially in the vertical plane of the rear wall of the trough and with the lower portion thereof resting against the said wall of the trough whereby to maintain the barrier frame in upright position at the back of said trough and prevent its being swung rearwardly, in the said position of the arms, the barrier frame being bodily movable upwardly and rearwardly with respect to said wall, with said arms, a flexible element connected with the barrier at the upper portion thereof, a pulley over which the said element is trained, and a counterweight connected with the flexible element and engageable with the pulley to limit the travel of the flexible element and thereby limit the downward movement of the barrier into the trough.

In testimony whereof I affix my signature.

WILLIAM Y. HITER.